United States Patent [19]

Doi et al.

[11] 3,885,978

[45] May 27, 1975

[54] INORGANIC COATING COMPOSITION

[75] Inventors: Kazuo Doi, Osaka; Jun Nakajima, Kyoto; Masahiko Shodai, Takatsuki; Junichi Uchimura, Nishinomiya; Takeaki Wada; Zenzaburo Shibata, both of Osaka, all of Japan

[73] Assignee: Matsushita Electric Works, Limited, Kadoma, Japan

[22] Filed: Sept. 12, 1973

[21] Appl. No.: 396,367

Related U.S. Application Data

[63] Continuation-in-part of Ser. No. 823,979, May 12, 1969, abandoned.

[30] Foreign Application Priority Data

| | | |
|---|---|---|
| May 31, 1968 | Japan | 43-37247 |
| May 31, 1968 | Japan | 43-37248 |
| May 31, 1968 | Japan | 43-37249 |
| May 31, 1968 | Japan | 43-37250 |

[52] U.S. Cl. ................................ 106/85; 106/89
[51] Int. Cl. ................................ C04b 19/00
[58] Field of Search ................ 106/85, 97, 104

[56] References Cited
UNITED STATES PATENTS

| | | | |
|---|---|---|---|
| 2,895,838 | 7/1959 | Ilenda | 106/38.3 |
| 2,964,415 | 12/1960 | Payne et al. | 106/38.3 |
| 3,148,996 | 9/1964 | Vukasovich et al. | 106/85 |
| 3,167,439 | 1/1965 | Vukasovich et al. | 106/85 |
| 3,179,527 | 4/1965 | Vukasovich et al. | 106/85 |
| 3,202,520 | 8/1965 | Enoch | 106/85 |

*Primary Examiner*—J. Poer
*Attorney, Agent, or Firm*—Wenderoth, Lind & Ponack

[57] ABSTRACT

Inorganic coating composition containing (1) a spinel type double oxide, for example of zinc and titanium, (2) a binder, for example aluminum phosphate, and (3) a curing agent, for example calcium hydroxide.

1 Claim, No Drawings

INORGANIC COATING COMPOSITION

This is a continuation-in-part of application Ser. No. 823,979 filed May 12, 1969, now abandoned.

This invention relates to an inorganic coating composition and also to a method of forming a protective coating on a substrate.

It is known to form a protective or corrosion-resistant coating on a substrate such as articles of slate, cement, metal, wood or the like. Most of conventional protective coatings of this kind are of organic ones such as asphalt, synthetic resins or the like. These organic coatings have various drawbacks that they are inflammable, low in thermal resistance, poor in hardness and not fully satisfactory in protective effect. Further, prior to providing such organic coating, the metal surface must be cleaned to remove rust. Even when an organic coating composition is applied on a rust-free clean metal surface or wood surface, it is difficult to obtain a firmly adherent coating. This is particularly true when a metal is to be coated.

Therefore, it is an object of this invention to provide an inorganic coating which is excellent in protective properties and is firmly adherent to the surface of a substrate.

Another object of this invention is to provide an inorganic coating which is hard, non-inflammable and high in resistance to heat, water and weather when applied to a substrate such as articles of slate, cement, metal, wood, asbestos or the like.

Still another object of this invention is to provide a protective coating which is firmly adherent to a metal surface even when the metal surface is not cleaned prior to applying the coating composition.

Other objects, features and advantages will be apparent from the following description.

Briefly, the present invention provides an inorganic coating composition which comprises (1) a spinel type double oxide of (a) a metal Zn, Mg, Ca or Ba and (b) at least one metal selected from the group consisting of Ti, Fe, Sn, Co, Cr, Al and Mn, (2) a binder selected from the group consistiing of (a) condensed phosphoric acid metal salts, said metal being selected from the group consisting of Al, Mg, Ca, Cu, Fe, Mn and Zn, and (b) phosphates of the formula in average:

$$MO \cdot xP_2O_5 \cdot yH_2O \qquad (I)$$

wherein M represents a metal selected from the group consisting of Al, Mg, Ca, Cu, Fe, Mn and Zn, the atomic ratio M/P is 0.25 – 1.0, each of $x$ and $y$ is a real number, and (3) a curing agent selected from the group consisting of $Ca(OH)_2$, white cement, alumina cement, portland cement, $CaCl_2$ and $MgCl_2$.

The double oxide to be used in this invention must have the so-called "spinel" structure. The metals forming the double oxide should comprise both (a) at least one metal selected from the group consisting of Zn, Mg, Ca and Ba and (b) at least one metal selected from the group consisting of Ti, Fe, Sn, Co, Cr, Al and Mn, while preferable metals of (a) are Zn and Mg and preferable metals of (b) are Ti, Fe, Al, Mn, Cr and Co. The double oxide may be prepared in any known manner. Thus, for example, one metal compound selected from the group consisting of oxides, hydroxides, carbonates and organic acid salts of metals of (a) is mixed with at least one metal compound selected from the group consisting of oxides, hydroxides, carbonates and organic acid salts of metals of (b), and the mixture is calcinated at a temperature from 700° to 1,300°C. for 1 – 5 hours to form a double oxide with spinel structure. The proportions of the various metal compounds and the temperature and time for the calcination are determined in order to form double oxides with spinel structure. These conditions of course vary depending upon the particular metal compounds, but can be easily determined by referring to known literatures relating to the production of spinel type double oxides. In any case the metal compounds to be used should be those which can form oxides upon the above mentioned calcination.

It is also possible to employ a mixture of metal compounds which are converted into a double oxide with spinel structure during the calcination. Thus, for example, it is possible to coprecipitate two metals in an insoluble form such as oxalate, carbonate, hydroxide or oxide from an aqueous solution containing these metals in a soluble form nitrate, sulfate, etc. Thus, for example, aqueous ammonia or aqueous solution of sodium hydroxide may be added to an aqueous solution containing iron sulfate and zinc sulfate to coprecipitate iron hydroxide and zinc hydroxide. The precipitate is recovered and calcinated in the manner as described above to prepare the desired double oxide. In any case the calcinated oxide product is pulverized.

Since the calcinated oxide or reactive oxide powders may be different in color depending upon the particular metal, suitable metal oxide or a mixture of metal oxides may be selected depending upon the color desired in the final protective coating. It is also possible to employ a commercial pigment if desired.

The other essential ingredient of the coating composition of this invention is a phosphate type binder.

According to the invention a condensed phosphate may be used. Thus, Al or a mixture of Al and other phosphates (primary phosphate, secondary phosphate, etc.) of Mg, Ca, Cu, Fe, Mn and Zn is dehydrated by heating at 120° – 280°C. preferably in a reducing atmosphere. It is preferable to conduct the heating at 120° – 230°C. for aluminium phosphate, magnesium phosphate and calcium phosphate, and at 120° – 280°C. for manganese phosphate, iron phosphate, zinc phosphate and cupper phosphate. In the thermal dehydration condensation, it is preferable to employ a catalyst such as borax, fluorite, kaolin or carbon (e.g., graphite). The amount of such catalyst may be less than 10% by weight based on the phosphate to be molecularly dehydrated for condensation. Further, the dehydration reaction may be conducted under a reduced pressure. In such case the temperature may be low within the temperature range mentioned above.

Another phosphate binder which may be used in this invention is represented by the following formula:

$$MO \cdot xP_2O_5 \cdot yH_2O$$

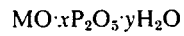

wherein M is Al or a mixture of Al and one or more of Ca, Mg, Cu, Fe, Mn and Zn, the atomic ratio M/P is 0.25 – 1.0, and each of $x$ and $y$ is a real number. The value $x$ may be determined from $0.25 \leq M/P \leq 1.0$, but the value $y$ varies depending upon the particular product and ambient moisture condition because the degree of hydration varies. Thus the phosphate may be Al or a mixture of Al and one or more of other commercially available primary phosphates of Ca, Mg, Cu, Fe, Mn and Zn. If desired, the primary phosphate may be mixed with one or more of secondary phosphates such as $2Al_2O_3 \cdot 3P_2O_5 \cdot 3H_2O$, $2CaO \cdot P_2O_5 \cdot H_2O$, $2MgO \cdot P_2O_5 \cdot H_2O$, etc.; sesquiphosphates such as $Al_2O_3 \cdot 2P_2O_5 \cdot 3H_2O$; and $CaH_2P_2O_7$, etc. Even in a form of mixture, it should satisfy the above formula.

As mentioned above, the atomic ratio M/P must be 0.25 – 1.0. If this ratio exceeds 1.0 it would be difficult to homogeneously dissolve the same in an aqueous medium. Even if a transparent and homogenous solution is obtained the stability thereof would be poor so that it would be difficult to store the solution for a prolonged period of time without the formation of undesirable precipitate and without causing decrease in reactivity. This is particular true in hot season. When the atomic ratio M/P is lower than 0.25, an unduly large amount of metal oxide (reactive pigment) is required in satisfactorily curing the coated layer so that the performance of the resulting protective layer is adversely affected.

The performance of the resulting protective coating is somewhat influenced by the kind of metal forming the phosphate binder. Generally the following tendency is observed:

Water resistance: Ca, Zn>Mg>Al>Mn, Fe, Cu
Adherence: Al>Mg>Ca>Cu>Fe>Zn

The reactive double oxide (metal oxide) and phosphate binder are mixed with water and an alkaline curing agent. Generally, about 15 – 70 parts by weight of the reactive oxide are used per 100 parts by weight of the phosphate binder. The amount of the curing agent or alkaline substance (as solid) may be 1 – 15 parts by weight, preferably 2 – 10 parts by weight per 100 parts by weight of the phosphate binder. In this case a strong alkaline substance such as sodium hydroxide and potassium hydroxide is not useful because it is too strongly reactive with the phosphate binder so that the binder becomes ineffective. Preferable alkaline curing agents are slaked lime or $Ca(OH)_2$, white cement, alumina cement, portland cement, $CaCl_2$ and $MgCl_2$, the latter two being active as an alkaline curing agent upon decomposition when baked. The alkaline curing agent is used in the form of powder. It would function not only for promoting the curing reaction but also for forming a coating with improved resistance to water.

The phosphate binder, double oxide and alkaline curing agent are mixed together, if desired further with water, to form a coating composition.

If desired, an inorganic filler may be added. Examples of fillers which may be used are clay (bentonite), sand, gypsum, furnace waste, etc. The filler may be added in an amount of 30% by weight or less based on the total amount of the binder and reactive double oxide.

The aqueous coating composition which is in the form of slurry or paste may be applied to the surface of an article to be protected in any suitable manner such as spraying, brush-painting, roller-coating, curtain flow-coating, airless-spraying, printing, etc. In case of a metal it is not necessary to clean and remove rust on the metal surface, although it is required to remove loose rust scale, before applying the coating composition.

The coated article may then be allowed to stand to effect moisture-cure. Thus, for example, it may be allowed to sand in an atmosphere of a relative humidity of 60 – 100% for 24 hours or more (e.g., 3 – 5 days) until satisfactory curing occurs. The temperature may be 20° – 100°C. However, in order to promote the moisture-cure it is preferable to employ a hot atmosphere up to 100°C. Generally, the higher the reactive humidity the lower the temperature may be.

Alternatively, in order to further improve the resistance to water, it is preferable that the coating is cured by heating. Thus, for example, the coated article may be heated at a temperature of 100° to 200°C. in a normal or open atmosphere. Generally higher the temperature the shorter the time of the heat treatment may be.

The feature of the coating composition of this invention is that the pot-life or shelf-life is long (e.g., 2 – 7 days).

By the above moisture-cure or thermal-cure, the coated composition is set or cured and becomes a hard, firmly adherent coating on the surface of an article. Even if the coating composition is applied on a rusty ferrous metal surface, the rust would be converted into a magnetite during the curing reaction so as to form a layer firmly adherent to the base metal. The appearance of the coating is enamel or porcelain like. Further the resulting coating is not only hard but also excellent in resistance to heat, flame, water and weather, and is stable for a prolonged period of time.

The coating composition of this invention is useful for the surface protection of any metallic or non-metallic article in any form such as sheets, plates, pipes, etc. The coating composition is also useful as a protective lining for pipes, vessels, etc. The coating composition is also useful in the surface protection of a wooden laminate, stone article, concrete article, slate, etc.

The invention will be further explained by the following examples which are given for illustration purpose only and not for limiting the scope of the invention in any way. In these Examples, all parts and percentages are by weight unless otherwise specified. Further, in these Examples, the hardness was determined by Barcol Impresser (ASTM D-2583-67), while durability against artificial weathering was determined by ASTM D822. The resistance to salt spray was determined by JIS Z 2371. Fire retardency was determined by directing gas burner flame to the specimen and observing change in appearance of the coating. The resistance to boiling water was determined by dipping the specimen in boiling water and measuring the time before change in appearance has occured.

EXAMPLE 1

| | |
|---|---|
| Binder | Molecularly dehydrated condensed (at 150°C.) primary phosphoric acid aluminum salt 60 parts. |
| Reactive oxide | A mixture of 20 parts zinc oxide and 10 parts titanium dioxide was calcinated at 800°C. for 3 hours and then pulverized. |
| Curing agent | $Ca(OH)_2$ 4 parts |
| Filler | Bentonite 6 parts |

A mixture of the above ingredients was mixed with 40 parts of water to obtain a coating composition. The coating composition was brushed onto the surface of an iron pipe. The coated pipe was allowed to stand in an atmosphere of 80% in relative humidity to effect mositure-cure for 36 hours. The resulting coating had the following properties:

| | |
|---|---|
| Adherence: | Firmly adhered although the surface before applying the coating composition was rusty. |
| Weather resistance: | No change observed even on Weather-O-Meter exposure for 1000 hours. |
| Resistance to heat: | Non-inflammable even when heated to 500°C. |
| Hardness: | Barcol hardness, higher than 70. |

The above coating composition (having a shelf life of 2 – 7 days) was applied on a slate and the coating was baked at 150 C. for 30 minutes. The Barcol hardness of the resulting coating was higher than 70, and no change was observed even when immersed in boiling water for 3 hours and even when immersed in acetone for 24 hours. The coating was subjected to temperature cycling test (i.e., 65°C. hot air 2 hours → 20°C. water 2 hours → −20°C. air 2 hours → 20°C. air 18 hours) but no change was observed even after 10 cycles.

EXAMPLE 2

| | |
|---|---|
| Binder | Molecularly dehydrated condensed (at 180°C.) magnesium primary phosphate 15 parts and 40 parts of dehydrated aluminum phosphate of Example 1. |
| Reactive oxide | A mixture of 20 parts magnesium oxide and 10 parts titanium oxide was calcinated at 900°C. for 2 hours and then pulverized. |
| Curing agent | White cement 5 parts |
| Filler | Bentonite 10 parts |

A mixture of the above ingredients was mixed with 60 parts of water and the resulting composition was sprayed on the inner surface of a steel pipe. The coated steel pipe was allowed to stand in an atmosphere of 70% relative humidity for 3 days to obtain a protective coating having characteristics similar to that obtained in Example 1.

EXAMPLE 3

| | |
|---|---|
| Binder | A mixture of 5 parts magnesium primary phosphate, 2 parts condensed primary aluminium phosphate and 3 parts aluminium sesquiphosphate; the metal/phosphorus atomic ratio 10/22. |
| Reactive oxide | A mixture of 5 parts ZnO and 5 parts $Fe_2O_3$ was calcinated at 900°C. for 2 hours and then pulverized. |
| Curing agent | $CaCl_2$ |

A mixture of 10 parts of the above binder and 3 parts of the above reactive oxide was mixed with 0.3 parts of $CaCl_2$ and 3 parts of water to prepare a coating composition. The coating composition was applied to the outer surface of an iron pipe which is cleaned from loose scale but is still rusty. The coated pipe was heated at 150°C. for 30 minutes to obtain a protective coating of the following properties:

| | |
|---|---|
| Adherence: | Firmly adhered. |
| Weather resistance: | No change observed even on Weather-O-Meter exposure for 500 hours. |
| Resistance to heat: | Non-inflammable even when heated to 500°C. |
| Hardness: | Higher than 70, Barcol hardness. |

EXAMPLE 4

| | |
|---|---|
| Binder | A mixture of 5 parts aluminium primary phosphate and 5 parts magnesium secondary phosphate; the metal/phosphorus atomic ratio 0.5. |
| Reactive oxide | 20 parts of zinc oxide and 10 parts of stannous oxide were calcinated together at 900°C. for one hour. |

A mixture of the above ingredients was mixed with 30 parts of water to prepare a coating composition. The coating composition was applied to the surface of a silico-calcium board and heated at 150°C. for 60 minutes to obtain a protective coating having properties similar to those of the coating obtained in Example 3.

EXAMPLE 5

| | |
|---|---|
| Binder | A mixture of 5 parts aluminium primary phosphate, 1 part calcium primary phosphate and 4 parts magnesium primary phosphate; and metal/phosphorus atomic ratio 0.4. |
| Reactive oxide | A mixture of 20 parts zinc oxide and 10 parts titanium oxide was calcinated at 1000°C. for 5 hours and pulverized. |
| Curing agent | $CaCl_2$ |

A mixture of 10 parts of the above binder and 5 parts of the above reactive double oxide and 0.5 part of $CaCl_2$ was mixed with 7.5 parts of water to prepare a coating composition. The coating composition was coated on a steel sheet and heated at 150°C. for 20 minutes to obtain a firmly adherent protective coating of the following properties:

| | |
|---|---|
| Durability against artificial weather: | 1000 hours |
| Resistance to salt spray: | more than 300 hours |
| Hardness: | higher than 60, Barcol hardness |
| Fire retardency: | non-inflammable (800°C.) |
| Resistance to boiling water: | no change in 3 hours |

EXAMPLE 6

| | |
|---|---|
| Binder | A mixture of 6 parts magnesium primary phosphate and 4 parts of aluminium sesquiphosphate; the metal/phosphorus atomic ratio 0.5. |
| Reactive oxide | A mixture of 5 parts magnesium oxide and 5 parts ferrous oxide was calcinated at 1200°C. for 2 hours, and then pulverized. |
| Curing agent | $MgCl_2$ |

A mixture of 10 parts of the above binder and 5 parts of the above reactive oxide powder was mixed with 0.5 part of $MgCl_2$ and 3 parts of water to prepare a coating composition. The coating composition was applied on the surface of an iron sheet and heated at 150°C. for 20 minutes to obtain a firmly adherent protective coating of the following properties:

| | |
|---|---|
| Durability against artificial weather: | 1000 hours |
| Resistance to salt spray: | more than 500 hours |
| Hardness: | higher than 60, Barcol hardness |
| Fire retardency: | non-inflammable (800°C.) |
| Resistance to boiling water: | more than 5 hours |

EXAMPLE 7

| | |
|---|---|
| Binder | A mixture of 1 part calcium primary phosphate, 5 parts primary aluminium phosphate and 4 parts magnesium secondary phosphate; the metal/phosphorus atomic ratio 10/21. |
| Reactive oxide | A mixture of 4 parts zinc oxide, 2 parts titanium oxide and 1 part calcium oxide was calcinated at 1000°C. for 3 hours, and then pulverized. |
| Curing agent | $MgCl_2$ |

A mixture of 10 parts of the above binder and 3 parts of the above reactive oxide was mixed with 0.3 part of $MgCl_2$ and 3 parts of water to prepare a coating composition. The coating composition was applied on a slate shingle and heated at 150°C. for 30 minutes to obtain a firmly adherent protective coating having the properties similar to those of Example 1.

EXAMPLE 8

| | |
|---|---|
| Binder | A mixture of 5 parts aluminium primary phosphate, 1 part calcium phosphate and 4 parts magnesium primary phosphate was heated at 140°C. for 2 hours. |
| Reactive oxide | A mixture of 10 parts zinc oxide and 10 parts manganese oxide was calcinated at 1000°C. for 5 hours. |
| Curing agent | Alumina cement. |

A mixture of 10 parts of the above binder powder and 5 parts of the above reactive oxide and 0.5 part of alumina cement was mixed with 7.5 parts of water and brushed on a cement plate. Then the coated concrete plate was heated at 80°C. for 30 days in 90% humidity box to obtain a firmly adhesive protective coating having the following properties:

| | |
|---|---|
| Durability against artificial weather: | 1000 hours |
| Hardness: | higher than 60, Barcol hardness |
| Fire retardency: | non-inflammable (500°C.) |
| Resistance to boiling water: | more than one hour. |
| Temperature cycling test (Example 1): | no change |

EXAMPLE 9

| | |
|---|---|
| Binder | Commercial aluminium phosphate was heated at 180°C. for 3 hours for dehydration condensation. |
| Reactive oxide | A mixture of 4 parts magnesium oxide and 6 parts cobalt oxide was heated at 1300°C. for 2 hours, and then pulverized. |
| Curing agent | $Ca(OH)_2$ |

A mixture of 10 parts of the above binder and 5 parts of the above reactive oxide was mixed with 0.5 part of $Ca(OH)_2$ and 7.5 parts of water to prepare a coating composition. The coating composition was applied onto an iron plate and heated at 150°C. for 20 minutes to obtain a protective coating having the properties similar to those of Example 6.

EXAMPLE 10

| | |
|---|---|
| Binder | A mixture of 3 parts aluminium primary phosphate, 5 parts calcium primary phosphate and 2 parts iron primary phosphate was heated at 180°C. for 2 hours to conduct dehydration condensation. |
| Reactive oxide | To an aqueous solution containing 10 parts zinc oxalate and 10 parts chromium oxalate was introduced ammonia gas to form coprecipitate. The precipitate was recovered and calcinated at 500°C. for 1 hour to obtain double oxide of zinc and chromium. |
| Curing agent | White cement. |

A mixture of 10 parts of the above binder and 3 parts of the above reactive oxide was mixed with 0.5 part of white cement and 6.5 parts of water and brushed on a steel sheet. The coated sheet was allowed to stand at normal temperature and under a relative humidity of 100% for days. The resulting coating had properties similar to those of Example 6 except that the resistance to boiling water was somewhat lower.

EXAMPLE 11

| | |
|---|---|
| Binder | Monocalcium phosphate was heated at 160°C. for 2 hours to conduct dehydration condensation. |
| Reactive oxide | A mixture of 50 parts zinc oxide and 50 parts aluminum oxide was heated at 1000°C. for one hour and then pulverized to obtain a double oxide powder. |
| Curing agent | White cement. |

A mixture of 10 parts of the above binder and 5 parts of the above reactive oxide was mixed with 6 parts of water and 1.0 part of commercial white cement powder to prepare a coating composition. The coating composition was brushed on a laminated wood sheet and heated at 110°C. for 10 minutes to obtain a firmly adherent coating.

What we claim is:

1. An inorganic coating composition which comprises (1) a spinel type double oxide of (a) at least one metal selected from the group consisting of Zn, Mg, Ca and Ba and (b) at least one metal selected from the group consisting of Ti, Fe, Sn, Co, Cr, Al and Mn, (2) a binder selected from the group consisting of (a) condensed phosphoric acid metal salts, said metal being Al or a mixture of Al and one or more of Mg, Ca, Cu, Fe, Mn and Zn and (b) phosphates of the formula $$MO \cdot xP_2O_5 \cdot yH_2O$$

wherein M is Al or a mixture of Al and one or more of Mg, Ca, Cu, Fe, Mn and Zn, the atomic ratio M/P being 0.25 – 1.0, and each of $x$ and $y$ is a real number, and (3) a curing agent selected from the group consisting of $Ca(OH)_2$, alumina cement, portland cement, $CaCl_2$ and $MgCl_2$, the amount of the double oxide being 15 – 70 parts by weight per 100 parts by weight of the phosphate binder and the amount of the curing agent being 1 – 15 parts by weight per 100 parts by weight of the phosphate binder.

* * * * *